(12) United States Patent
Goll et al.

(10) Patent No.: US 10,526,931 B2
(45) Date of Patent: Jan. 7, 2020

(54) ELECTROHYDRAULIC VALVE AND METHOD FOR PRODUCING THE ELECTROHYDRAULIC VALVE

(71) Applicant: ECO Holding 1 GmbH, Marktheidenfeld (DE)

(72) Inventors: Juergen Goll, Collenberg (DE); Sebastian Nickel, Gemünden am Main (DE); Andre Selke, Lohr am Main (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 16/106,573

(22) Filed: Aug. 21, 2018

(65) Prior Publication Data

US 2019/0055859 A1 Feb. 21, 2019

(30) Foreign Application Priority Data

Aug. 21, 2017 (DE) .......................... 10 2017 119 082
May 4, 2018 (DE) .......................... 10 2018 110 755

(51) Int. Cl.
*F01L 1/46* (2006.01)
*B23K 20/10* (2006.01)
(Continued)

(52) U.S. Cl.
CPC ................ *F01L 1/46* (2013.01); *B23K 20/10* (2013.01); *B23P 15/001* (2013.01); *F01L 1/344* (2013.01);
(Continued)

(58) Field of Classification Search
CPC .............................. B23K 20/10; F01L 1/3442; F01L 2001/3443; F01L 2001/34479; F01L 1/46;
(Continued)

(56) References Cited

U.S. PATENT DOCUMENTS 5,518,029 A * 5/1996 Schumacher ....... F16K 27/0245
137/625.65
2005/0139180 A1* 6/2005 Isobe .................. F16K 31/0613
123/90.17

FOREIGN PATENT DOCUMENTS

CN 104196587 A 12/2014
CN 204042396 U 12/2014
(Continued)

Primary Examiner — Jorge L Leon, Jr.
(74) Attorney, Agent, or Firm — Von Rohrscheidt Patents (57) ABSTRACT

An electro hydraulic valve for a cam phaser, including an electromagnetic actuator assembly, and a hydraulic assembly, wherein the electromagnetic actuator assembly and the hydraulic assembly are arranged axially aligned along a longitudinal axis, wherein the hydraulic assembly includes a valve housing in which a valve piston is arranged axially movable along the longitudinal axis, wherein a plunger for positioning the valve piston along the longitudinal axis is arranged within the electromagnetic actuator assembly, and wherein the electromagnetic actuator assembly and the hydraulic assembly are connected with one another indirectly or directly, wherein the electromagnetic actuator assembly includes an actuator housing and a friction or form locking connection of the electromagnetic actuator assembly with the hydraulic assembly is provided by an ultrasonic weld between the actuator housing and the valve housing.

13 Claims, 4 Drawing Sheets

(51) Int. Cl.
  *B23P 15/00* (2006.01)
  *F01L 1/344* (2006.01)
  *F15B 13/043* (2006.01)
  *F16K 27/04* (2006.01)
  *F15B 13/00* (2006.01)

(52) U.S. Cl.
  CPC ........ *F01L 1/3442* (2013.01); *F15B 13/0435* (2013.01); *F16K 27/048* (2013.01); *F01L 2001/3443* (2013.01); *F01L 2101/00* (2013.01); *F01L 2103/00* (2013.01); *F15B 13/00* (2013.01)

(58) Field of Classification Search
  CPC ............. F01L 2013/101; F01L 2101/00; F01L 2103/00; F16K 27/048
  USPC ..................................................... 123/90.15
  See application file for complete search history.

(56) References Cited

FOREIGN PATENT DOCUMENTS

| | | |
|---|---|---|
| CN | 205956425 U | 2/2017 |
| DE | 4332948 A1 | 3/1995 |
| DE | 19521510 A1 | 12/1996 |
| DE | 10335487 A1 | 3/2004 |
| DE | 102009043320 A1 | 4/2011 |
| DE | 102014010876 B3 | 10/2015 |
| WO | WO2011035847 A1 | 3/2011 |

* cited by examiner

ELECTROHYDRAULIC VALVE AND METHOD FOR PRODUCING THE ELECTROHYDRAULIC VALVE

RELATED APPLICATIONS

This application claims priority from and incorporates by reference German patent application DE 10 2017 119 082.1 filed on Aug. 21, 2017 and DE 10 2018 110 755.2 filed on May 4, 2018, both of which are incorporated in their entirely by this reference.

FIELD OF THE INVENTION

The invention relates to an electrohydraulic valve, in particular an electrohydraulic valve of a cam phaser.

BACKGROUND OF THE INVENTION

Generic electro hydraulic valves are known from DE 10 2014 010 876 B3 and DE 10 2009 043 320 A1.

When mounting the electromagnetic actuator assembly and the hydraulic assembly typically a friction locking and form locking connection is generated in an end position of both subassemblies. Typically the friction locking and form locking connection is provided by sextuple or quadruple crimping of the valve housing and a portion of the metal sleeve that protrudes beyond the magnet housing. Thus, the two components are connected with each other through plastic deformation. The economic benefit of a crimp connection is that the joining partners can also be joined with highly variable clearance so that a precise preparation of the joining partners can be omitted. A certain unpredictability of the connection, however, is disadvantageous and thus a crimped connection is typically used where only small mechanical loads occur.

Since the hydraulic assembly is flowed through by a hydraulic fluid, typically a hydraulic oil the actuator assembly has to be sealed relative to the hydraulic assembly of the electro hydraulic valve reliably so that in particular a coil of the electromagnetic actuator assembly is protected against a penetration of the hydraulic fluid. In the crimped connection recited supra between the valve housing and the metal sleeve leakages can occur from the ambient into the coil of the electromagnetic actuator assembly at the joint and between the metal housing and the metal sleeve.

BRIEF SUMMARY OF THE INVENTION

Thus, it is an object of the invention to provide an electrohydraulic valve with an electromagnetic actuator assembly and a hydraulic assembly, in particular an electro hydraulic valve of a cam phaser which reliably seals the electromagnetic actuator assembly relative to the hydraulic assembly and the ambient and which eliminates possible leakages and which has an improved joining force and radial strength over he operating temperature range of the electro hydraulic valve over the prior art. It is another object of the invention to provide an energy efficient and quick method for producing the electro hydraulic valve and in particular for producing a connection of the electromagnetic actuator assembly with the hydraulic assembly which is also suitable for producing large production volumes.

This object is achieved according to the invention by an electro hydraulic valve for a cam phaser, including an electromagnetic actuator assembly, and a hydraulic assembly, wherein the electromagnetic actuator assembly and the hydraulic assembly are arranged axially aligned along a longitudinal axis, wherein the hydraulic assembly includes a valve housing in which a valve piston is arranged axially movable along the longitudinal axis, wherein a plunger for positioning the valve piston along the longitudinal axis is arranged within the electromagnetic actuator assembly, and wherein the electromagnetic actuator assembly and the hydraulic assembly are connected with one another indirectly or directly, wherein the electromagnetic actuator assembly includes an actuator housing and a friction or form locking connection of the electromagnetic actuator assembly with the hydraulic assembly is provided by an ultrasonic weld between the actuator housing and the valve housing.

The object is also achieved by a method for producing the electro hydraulic valve recited supra, wherein the electro hydraulic valve includes the electromagnetic actuator assembly and the hydraulic assembly, wherein the hydraulic assembly includes a valve housing, and wherein the actuator assembly includes an actuator housing, the method comprising the step connecting the actuator housing of the actuator assembly with the valve housing by an ultrasonic weld indirectly or directly through friction locking or form locking.

Advantageous embodiments are provided in the dependent claims.

An electro hydraulic valve is particularly advantageous that includes an electro magnetic actuator assembly and a hydraulic assembly, in particular an electro hydraulic valve of a cam phaser where the actuator assembly and the hydraulic assembly are arranged axially aligned along a longitudinal axis wherein the hydraulic assembly includes a valve housing in which a valve piston is arranged axially movable along the longitudinal axis, wherein a plunger for positioning the valve piston along the longitudinal axis is arranged within the actuator assembly and wherein the actuator assembly and the hydraulic assembly are connected with one another indirectly or directly, characterized in that actuator assembly includes an actuator housing and a friction and/or form locking connection of the actuator assembly with the hydraulic assembly is established by ultrasound welding of the actuator housing of the actuator assembly with the valve housing.

Since the actuator assembly is connected with the hydraulic assembly by ultrasonic welding in a friction locking and/or form locking manner and an electro hydraulic valve according to the invention is producible in an economical, in particular energy efficient manner quickly and in large volumes.

Thus, it is a core idea of the invention to connect the hydraulic assembly and the actuator assembly by ultrasonic welding of the actuator housing of the actuator assembly and by a resultant friction and/or form locking connection between the hydraulic assembly and the actuator assembly. In particular the ultrasonic weld can be provided with a suitable joining force between the assemblies to be connected so that a predetermined vehicle specific operating range of the electro hydraulic valve can be provided.

Advantageously the ultrasonic weld is sized and configured so that a sufficient torque is sustained in the predetermined operating temperature range of the electro hydraulic valve. Thus, it can be assured that the actuator assembly and the hydraulic assembly of the electro hydraulic valve are not rotated relative to each other during operations.

Typically, an oscillation is introduced in a vertical direction to the joining partners during ultrasonic welding. The joining partners heat up and soften which increases the damping coefficient. The increase of the damping coefficient leads to increased inner friction which further accelerates the temperature increase. The melted materials connect and are welded together after cooling and solidifying. The ultrasonic valve provides a bonded connection. Different materials can be connected with each other. The work pieces are only heated slightly in the welding portion so that adjacent material is not damaged. The ultrasonic welding method can be monitored electronically and is also suitable for large numbers. The method is furthermore characterized by very small welding times and high efficiency.

The ultrasonic welding is an energy efficient and quick method for joining thermoplastic synthetic materials and metal materials like e.g. aluminium, copper and their alloys. Ultrasonic welding introduces the weld energy into the joining surface of thermoplastic and/or metal work pieces by generating ultrasonic oscillations (20-30-40 kHz). The welding is achieved by a high frequency mechanical oscillation which leads to a heating by molecular and boundary surface friction between the components, for metals it also leads to a teething and interlocking of the joining partners. A generator typically generates a high frequency AC current and transmits it through a coaxial cable to an ultrasound converter which generates a mechanical ultrasound vibration therefrom using the piezo electric or magneto strictive method. The vibrations are transmitted to the sonotrode through an amplitude transformation element. The vibrations are transmitted under pressure through the structured and/or corrugated operating surface of the sonotrode to the work pieces to be connected.

In particular the electro hydraulic valve for a cam phaser of a cam shaft can include a valve piston that is axially movable in the valve housing of the hydraulic assembly of the electro hydraulic valve. Furthermore, a first operating connection, a second operating connection and a supply connection can be configured at the valve housing. The first operating connection and the second operating connection are connected with the cam phaser and a hydraulic fluid is feedable through the connections into the electro hydraulic valve as well as from the electro hydraulic valve. In order to supply the electro hydraulic valve with the hydraulic fluid that is fed by a feed arrangement the valve housing includes the supply connection. The hydraulic fluid can flow through the electro hydraulic valve in different ways due to a flowable channel system of the valve piston.

The valve piston is moved by the electromagnetic actuator assembly of the electro hydraulic valve. For this purpose, the actuator assembly includes a typically axially move able plunger which is operatively connected with the valve piston. An axial movement of the plunger is transmitted to the valve piston so that the valve piston adjusts its position within the hydraulic assembly.

Furthermore the electromagnetic actuator assembly includes an actuator housing which can be formed by a plastic encasement in which a magnetizeable metal sleeve is embedded. The metal sleeve can protrude axially beyond the actuator housing. The actuator housing is connected with the valve housing by ultrasonic welding according to the invention. The actuator housing can also be designated as encasement of the coil or of the actuator assembly with synthetic material through injection molding and thus forms a housing that protects the actuator assembly which is used on the other hand side for establishing the ultrasonic welded connection with the valve housing of the hydraulic assembly.

In an advantageous embodiment the actuator housing of the actuator assembly is made from a thermoplastic synthetic material and envelops the actuator assembly completely or partially. Advantageously the actuator housing is made from a polyamide or a polyamide resin. In particular a 35% glass fiber reinforced temperature stabilized hydrolysis resistant polyamide 66 resin for injection molding (PA 66 GF 35) can be used which has excellent mold filling capabilities.

In another advantageous embodiment the valve housing is made from a metal material, in particular aluminium. The selection of the materials for the actuator housing of the actuator cluster and the valve housing provides that they can be produced in a cost-effective manner and can be connected with each other through ultrasonic welding in a form locking and/or friction locking manner.

In another advantageous embodiment the valve housing includes a circular flange at an end oriented towards the actuator assembly, wherein the circular flange is undercut by the actuator housing of the actuator assembly. Accordingly the actuator assembly of the actuator housing of the actuator assembly is configured to receive the circular flange.

In another advantageous embodiment the actuator housing of the actuator assembly reaches with its end oriented towards the valve housing over one or plural undercuts and/or flat spots at the valve housing at least in a form locking manner after producing the ultrasonic weld. Alternatively, or additionally the actuator housing of the actuator assembly can reach over one or plural undercuts at the valve housing in a form locking manner at an end oriented towards the valve housing after producing the ultrasonic weld. A friction locking of this type can be produced in particular in that the ultrasonic welding is performed with a corresponding axial joining force between the assemblies. This generates a form locking connection as well as a friction locking connection.

The sections of the actuator housing which reach over the undercuts at the valve housing in a form locking manner can be configured in particular integrally in one piece with and from the same material as the actuator housing.

In another advantageous embodiment the undercuts and/or flat spots are configured as a symmetrical polygon. The undercuts and/or flat spots configured as symmetrical polygon can follow in the axial direction viewed from the actuator housing behind the flange of the valve housing, this means that the valve housing can have a flange where a circumferential section with plural undercuts and flat spots adjoins. The flat spots can form a symmetrical polygon e.g. a hexagon. Four, five, six, eight, ten or twelve flat spots of a uniform 4, 5, 6, 8, 10, or 12-sided polygon can be arranged. The flat spots can be inclined in an axial direction towards the flange.

According to an advantageous embodiment the actuator housing includes pre-segmented bars which reach behind the undercuts and/or flat spots after the ultrasonic welding and/or which contact the undercuts and/or flat spots after the ultrasonic welding. The arrangement of the plurality of circumferentially arranged pre-segmented bars corresponds with the outer contour of the valve housing and the circumferentially distributed arrangement of the undercuts and/or the flat spots. A combination of undercuts and flat spots is feasible which facilitates securing the components in the axial direction by the undercuts and in the circumferential direction by the flat spots. Thus, tension forces as well as torques can be received.

The pre-segmented bars of the actuator housing of the actuator assembly which reach over the undercuts at the valve housing in a form locking manner can be configured in particular integrally in one piece and from the same material as the actuator housing. The pre-segmented bars of the actuator housing are welded together ultrasonically with the respectively corresponding flat spot of the valve housing. Instead of flat spots the valve housing can include circumferentially arranged recesses in which the bars of the actuator housing are welded ultrasonically so that a form locking and/or friction locking connection is provided. The circumferential distribution of the pre segmented bars of the actuator housing can correspond for example to a circumferential arrangement at angular positions of 0°, 60°, 120°, 280° and 300°.

In another advantageous embodiment the actuator housing of the actuator assembly is bonded by ultrasonic welding with a single component or multicomponent connection element wherein the connection element is connected in a friction locking manner with the hydraulic assembly after producing the ultrasonic weld.

Using a connection element is advantageous wherein the connection element is arranged between the actuator housing of the actuator assembly and the valve housing like e.g. a single piece and multi piece ring for fabricating the connection of the actuator housing of the actuator assembly with the valve housing by ultrasonic welding in order to achieve a high quality connection of the two components with rather small engineering design changes to the actuator assembly and the valve housing of the hydraulic valve assembly itself.

The connection element that advantageously reaches over the hydraulic assembly in a form locking manner secures the hydraulic assembly relative the actuator assembly. The connection element is advantageously configured as a thermoplastic synthetic material ring. The connection element is ultrasonically welded to the actuator housing of the actuator assembly.

Advantageously the actuator housing has a receiving geometry and the connection element has a corresponding penetration geometry, wherein the penetration geometry engages the receiving geometry in order to perform the ultrasonic welding. A connection element with this configuration can be mounted in a simple manner.

According to an advantageous embodiment of the invention the connection element includes a circumferential bar which is pressed against a flange of the valve housing after establishing the ultrasonic weld.

Friction locking of the connection element with the actuator assembly and with the valve housing of the hydraulic assembly provides that the electrohydraulic valve or the connection between the actuator assembly and the hydraulic assembly can sustain to a torque in the operating temperature range of the electro hydraulic valve.

In another advantageous embodiment a seal is arranged between the actuator assembly and the hydraulic assembly. The seal is in particular an O-ring seal which is inserted in particular into an annular groove. The circumferential annular groove can be configured by an annular groove in the actuator assembly or by an annular groove in the hydraulic assembly whereas the counter piece is respectively flat. Alternatively, the circumferential ring groove can be configured by aligned ring grooves in the actuator assembly as well as in the hydraulic assembly. The grove can be a triangular groove with a triangular cross section.

In another advantageous embodiment a seal is inserted between the actuator assembly and the hydraulic assembly and the actuator assembly and the hydraulic assembly are sized so that the seal is pressed into the ring groove after the ultrasonic weld has been fabricated. The assemblies are compressed with a suitable joining force, simultaneously the inserted O-ring seal is compressed.

After fabricating the ultrasonic weld of the actuator housing with the valve housing the seal is permanently compressed. The seal is axially compressed by the friction locking and/or form locking connection of the actuator assembly with the hydraulic assembly that is generated by the ultrasonic weld between the actuator housing and the valve housing.

It is particularly advantageous in the method for producing an electro hydraulic valve with an actuator assembly and a hydraulic assembly wherein the hydraulic assembly includes a valve housing and wherein the actuator assembly includes an actuator housing that the actuator housing of the actuator assembly is connected with the valve housing by ultrasonic welding indirectly or directly in a friction locking and/or form locking manner.

In an advantageous embodiment the actuator housing of the actuator assembly is made from a thermoplastic synthetic material and the valve housing is made from a metal material. Thus, the actuator housing can made from one piece and in particular from the same material or from several components. When using several components for producing the actuator housing the components can be welded together ultrasonically.

In another advantageous embodiment a seal, in particular an O-ring seal is inserted between the actuator assembly and the hydraulic assembly before fabricating the ultrasonic weld wherein the seal is compressed axially by joining and ultrasonically welding the actuator assembly and the hydraulic assembly.

BRIEF DESCRIPTION OF THE DRAWINGS

Two embodiments of electro hydraulic valve are illustrated in the drawing, figure, wherein.

DETAILED DESCRIPTION OF THE INVENTION

Identical components and assemblies are designated in the drawing figures with identical reference numerals.

Figure 1A:
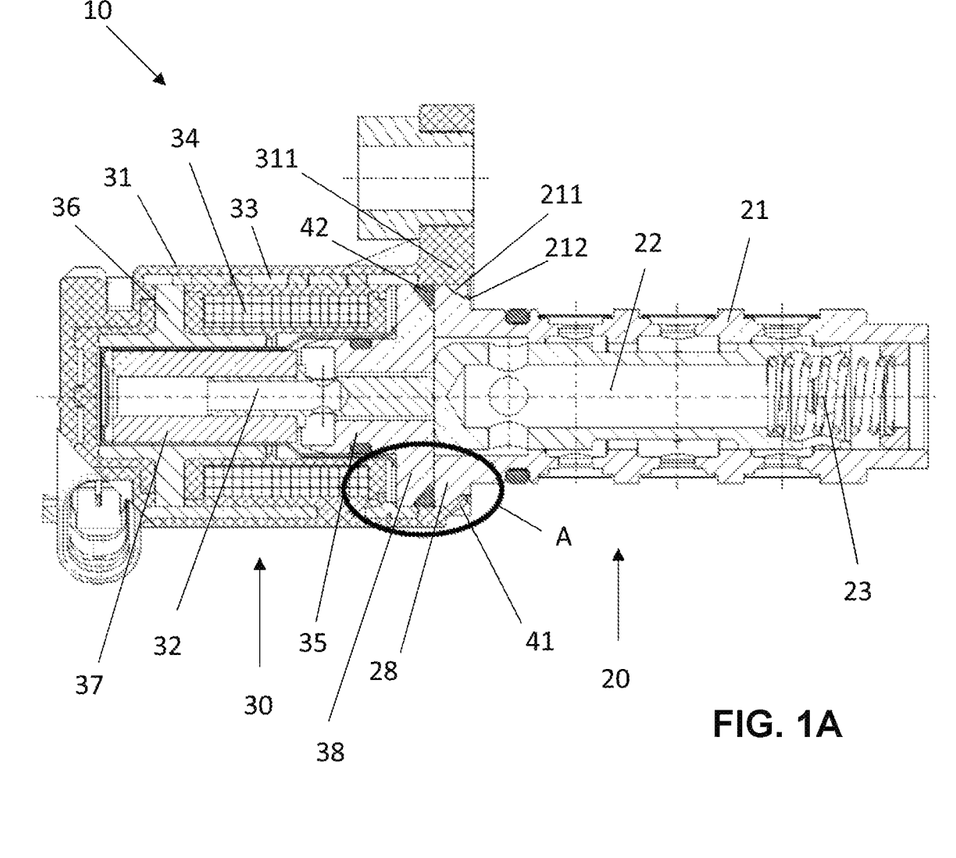
FIG. 1A illustrates a longitudinal sectional view of a first embodiment of the electrohydraulic valve.

FIG. 1A illustrates a longitudinal sectional view of an electro hydraulic valve 10 according to one embodiment. The illustrated electro hydraulic valve 10 is an electro hydraulic valve of a cam phaser.

A non-illustrated cam phaser facilitates adjusting opening and closing timing of gas control valves during operations of a non-illustrated internal combustion engine. Thus, the cam phaser continuously adjusts an angular orientation of a non-illustrated cam shaft of the internal combustion engine relative to a non-illustrated crank shaft of the internal combustion engine wherein the cam shaft is rotated relative to the crank shaft. Rotating the cam shaft adjusts opening and closing times of the gas control valves so that the internal combustion engine is operated in an optimum manner at a respective speed.

The electro hydraulic valve 10 includes a hydraulic assembly 20 and an electromagnetic actuator assembly 30 which are arranged axially aligned along the longitudinal axis 50. The hydraulic assembly 20 includes a bushing shaped valve housing 21 in which a valve piston 22 is arranged axially movable along the longitudinal axis 50. The actuator assembly 30 includes an actuator housing 31. Furthermore, a plunger 32 for positioning the valve piston 22 along the longitudinal axis 50 is arranged axially movable within the actuator assembly 30. The actuator housing 31 of the actuator assembly 30 and the valve housing 21 of the hydraulic assembly 20 are directly connected with each other. A friction locking and/or form locking connection of the actuator assembly 30 with the hydraulic assembly 20 is produced by ultrasonic welding of the actuator housing 31 with the valve housing 21.

In order to move the valve piston 22 a first face of the valve piston 22 that is oriented towards the actuator assembly 30 is closed so that the plunger 32 of the actuator assembly 30 can contact the first face. Loading the coil 34 of the actuator assembly 30 with current leads to an axial displacement of the plunger 32 and thus to an axial displacement of the valve piston 22 wherein a retaining element 23 that is arranged at a second face of the valve piston 22 which is oriented away from the first face imparts a retaining force upon the valve piston 22 against which the valve piston 22 has to be moved. The valve housing 21 of the hydraulic assembly 20 and the valve piston are flowed through by a hydraulic fluid. The hydraulic assembly 20 is sealed relative to the actuator assembly 30.

The actuator assembly 31 of the actuator assembly 30 that is at least configured cylindrical in sections is provided as a synthetic material encasement through injection molding and is configured to receive a magnetizable metal sleeve 33 and a coil 34 that is radially enveloped by a metal sleeve 33. The actuator housing 31 includes among other things a pole core 35, a pole core yoke 36 and an armature 37. The plunger 32 is operatively connected with the armature 37.

Figure 3A:
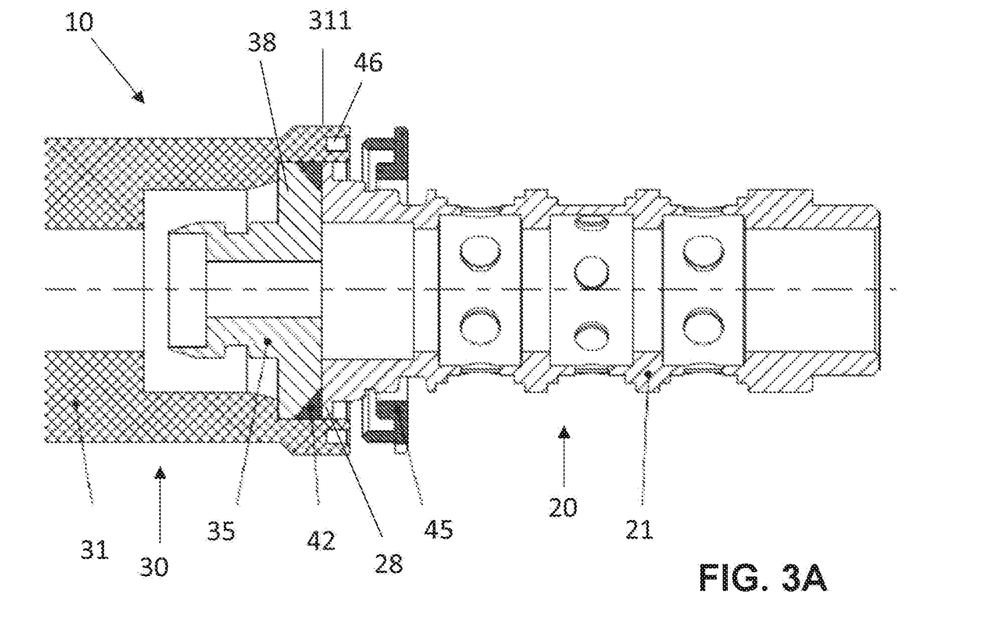
FIG. 3A illustrates a longitudinal sectional view of a second embodiment of an electro hydraulic valve with an actuator assembly and a hydraulic assembly in non-connected condition.
Figure 3B:
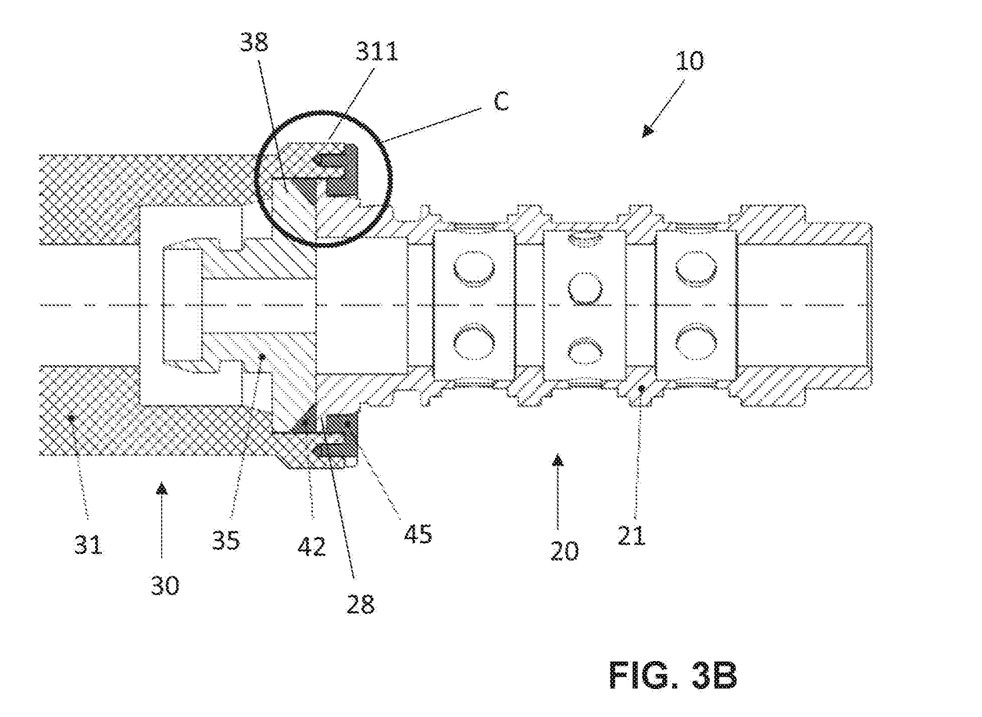
FIG. 3B illustrates a longitudinal section view of the electro hydraulic valve according to FIG. 3A in a connected condition

The pole core 35 is advantageously configured flush with a pole core flange 38. The pole core 35 is arranged at an end of the actuator housing 31 that is oriented towards the hydraulic assembly 20 so that the pole core flange 38 forms a contact surface that is configured to contact a contact surface of the hydraulic assembly 20 as illustrated in FIG. 1A and FIG. 3A and FIG. 3B. The pole core 35 is arranged at an end of the actuator housing 31 that is oriented towards the hydraulic assembly 20 so that the pole core is in contact with the at least one metal sleeve 33.

The actuator housing 31 of the actuator assembly 30 envelops the actuator assembly 30. In the first embodiment according to FIGS. 1A-2B the actuator housing 31 is configured integrally in one piece from the same material. The actuator housing 31 of the actuator assembly 30 is produced as an injection molded component from a thermoplastic synthetic material. The actuator housing 31 is used for producing the friction locking and form locking connection of the actuator housing 31 of the actuator assembly 30 with the valve housing 21 of the hydraulic assembly in that the actuator housing 31 is ultrasonically welded with the valve housing 21.

Figure 1B:
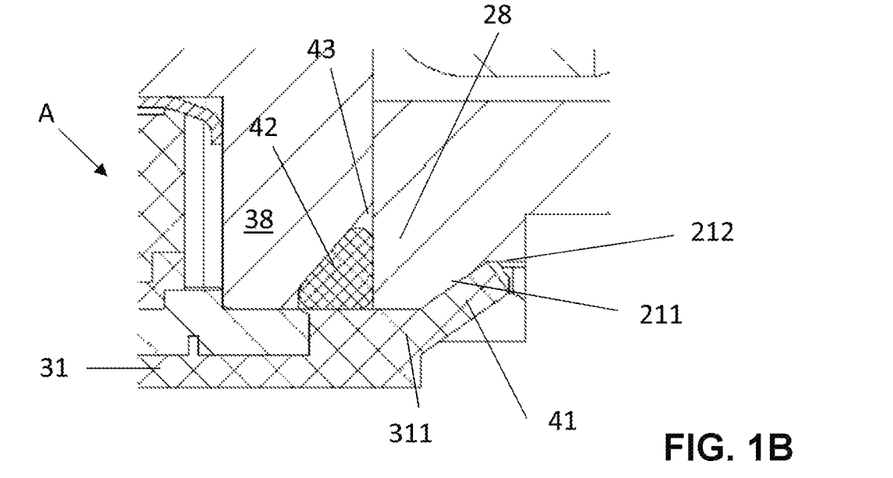
FIG. 1B illustrates a blown-up view of a detail A according to FIG. 1A.
Figure 2A:
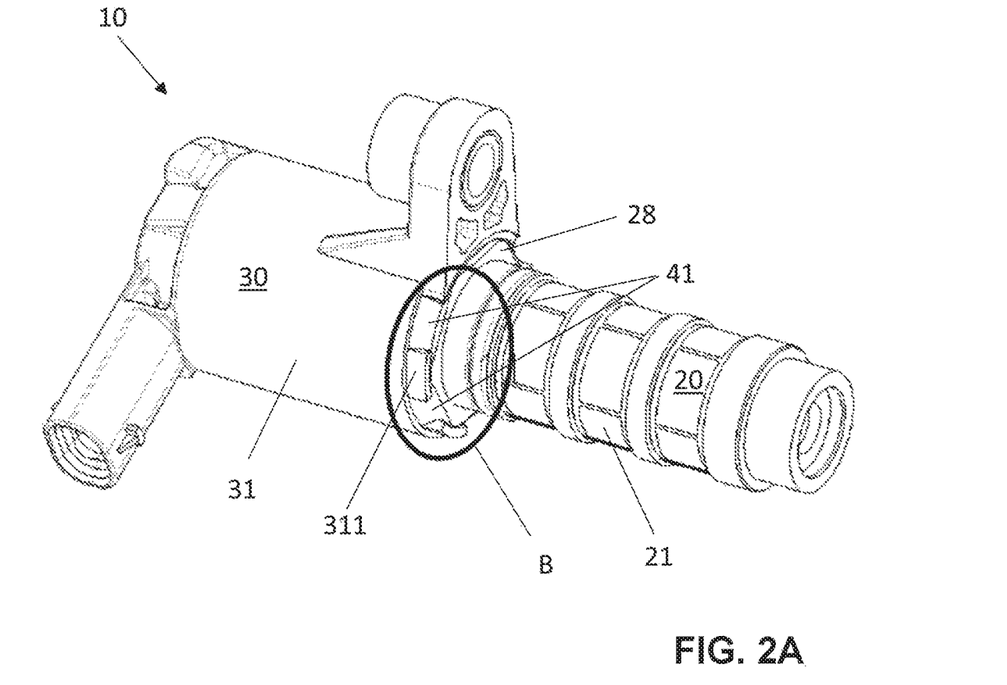
FIG. 2A illustrates a perspective view of the electro hydraulic valve according to FIG. 1A.
Figure 2B:
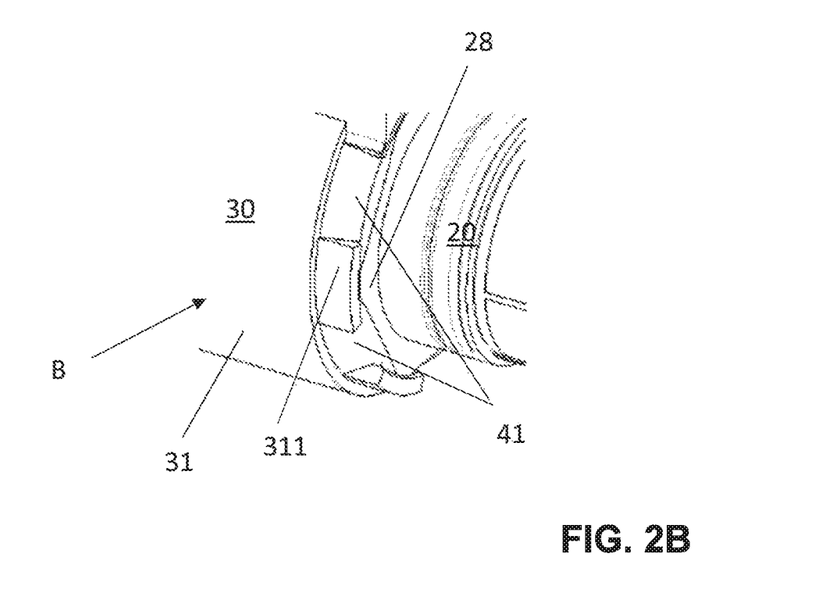
FIG. 2B illustrates an enlarged view of a detail B of the electro hydraulic valve according to FIG. 2A.

As evident from FIG. 2A and 2B the actuator housing 31 of the actuator group 30 includes a plurality of pre-segmented bars 41. The bars 41 are configured within an annular overhang 311 of the actuator housing 31 which partially reaches around the valve housing 21. The bars 41 are configured so that they can reach over and behind undercuts 211 of the valve housing 21 as illustrated in (FIG. 1A and FIG. 1B) after ultrasonic welding. The overhang 311 of the actuator housing 31 that is oriented towards the hydraulic assembly 20 and the bars 41 which reach over and behind the undercuts 211 at the valve housing 21 in a form locking manner after the ultrasonic weld is created are configured integrally and from the same material as the actuator housing 31.

A non-illustrated embodiment provides to configure the annular overhang 311 of the actuator housing 31 circumferential and to deform it only in segments by the ultrasonic welding.

The valve housing 21 of the hydraulic assembly 20 includes a contact surface at an end of that is oriented towards the actuator assembly 30 wherein the contact surface is configured to contact an opposite contact surface of the actuator assembly 30. The contact surface of the actuator assembly 30 is formed by the pole core flange 38. The contact surface of the hydraulic assembly 20 is formed by the circular flange 28 that is configured at an end of the valve housing 21 that is oriented towards the actuator assembly 30. The actuator housing 31 of the actuator assembly 30 is configured to receive the circular flange 28 of the valve housing.

The valve housing 21 is made from a metal material, in the illustrated embodiment it is made from aluminium. The valve housing 21 includes undercuts 211 and flat spots 212 at an end oriented towards the actuator housing 31. The undercuts 211 and flat spots 212 are arranged in the axial direction starting from the actuator assembly 30 behind the circular flange 28.

As illustrated in FIGS. 1A and 1B the overhang 311 of the actuator housing 31 of the actuator assembly 30 reaches over the circular flange 38 at an end of the actuator housing 31 that is oriented towards the valve housing 21 and engages plural undercuts 211 behind the flange 28 at the valve housing 21 in a form locking manner with the bars 41 that are deformed after producing the ultrasonic weld. The undercuts 211 and the flat spots 212 that are distributed over the circumference of the valve housing 21 are shaped as a symmetrical polygon. Other shapes, however, are conceivable to establish the form locking connection within the spirit and scope of the invention.

As described and illustrated in FIGS. 1A, 1B and 2A and 2B the bars 41 of the overhang 311 of the actuator housing of the actuator assembly 30 contact the undercuts 211 of the valve housing 21 in a form locking manner after the ultrasonic welding and are in direct contact with the flat spots 212.

As illustrated in FIGS. 1A and 1B a seal 42 configured as an O ring seal is arranged to seal the hydraulic assembly 20 relative to the actuator assembly 30 between the actuator assembly 20 and the hydraulic assembly 30. The seal 42 is inserted into a circumferential annular groove 43. The annular grove 43 is configured as a triangular groove and thus has a triangular cross section. The annular groove 43 is formed by the circular flange 28 of the valve housing 21, the overhang 311 of the actuator housing 31 and the pole core flange 38 of the pole core 35 arranged in the actuator assembly 30 in joined condition, this means when the assemblies are arranged so that they contact each other. The annular groove 43 is sized so that the seal 42 is axially pressed into the annular groove 43 after establishing the ultrasonic weld.

Figure 3C:
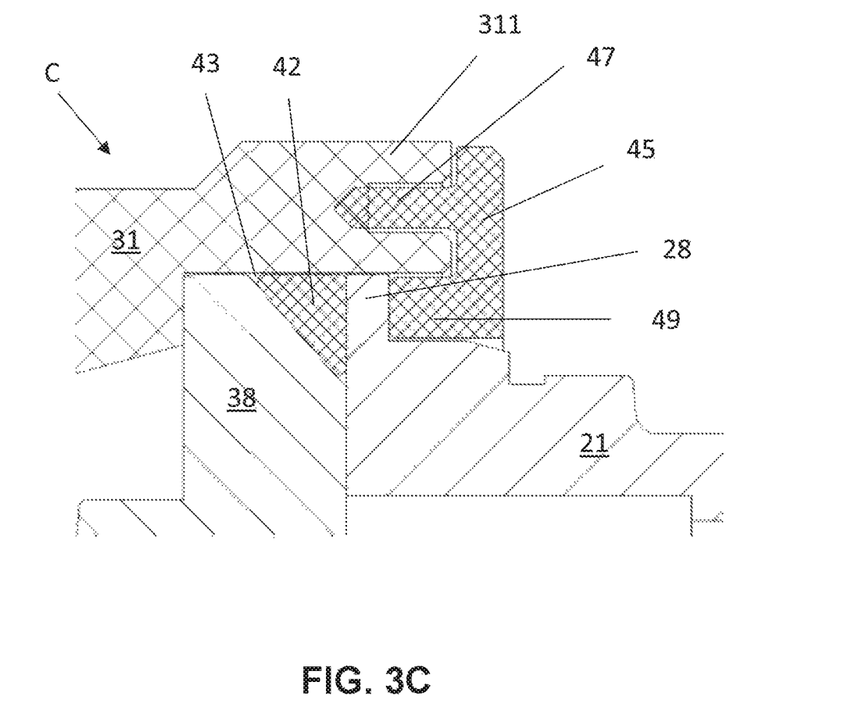
FIG. 3C illustrates an enlarged view of a detail C according to FIG. 3B.

FIGS. 3A-3C illustrate a second embodiment of an electro hydraulic valve. Thus, a friction locking and/or form locking connection of the actuator assembly 30 with the hydraulic assembly 20 is established by ultrasonically welding an additional connection element 45 with the overhang 311 of the actuator housing 31 of the actuator assembly 30 that is oriented towards the hydraulic assembly 20 and with the valve housing 21.

FIG. 3A illustrates a longitudinal sectional view of the actuator assembly 30 and the hydraulic assembly 20 of the second embodiment of the electro hydraulic valve 10 in a non-connected condition. The additional connection element 45 is formed in the illustrated embodiment by a one-piece thermoplastic synthetic material ring. In a non-illustrated alternative, the additional connection element is formed by a multicomponent ring. The connection element 45 is ultrasonically welded together with the overhang 311 of the actuator housing 31 of the actuator assembly 30 that is oriented towards the hydraulic assembly 20 while loaded with a suitable joining force in the axial direction. Due to the welding of the annular connection element 45 with the actuator housing 31 while loaded with an axial joining force the connection of the actuator assembly 30 with the hydraulic assembly 20 is provided form locking as well as friction locking.

In order to ultrasonically weld the connection element 45 with the overhang 311 the overhang 311 includes a receiving geometry 46 in which a corresponding penetration geometry 47 of the connection element 45 can engage. The penetration geometry 47 can be configured for example as a circumferential or segmented key/bar or as uniformly distributed pins. The receiving geometry 46 is accordingly configured e.g. groove shaped or as a bore hole.

The penetration geometry 47 of the annular connection element 45 engages the corresponding receiving geometry 46 in the forward overhang 311 of the actuator housing 31 and is ultrasonically welded after insertion and after loading with an axial joining force. The penetration geometry 47 is thus sized so that the melted material of the penetration geometry 47 completely fills the receiving geometry 46 and the overhang 311 of the actuator housing 31 of the actuator assembly 30. When ultrasonically welding the connection element 45 with the actuator housing 31 that reaches around the actuator assembly 30 material of the penetration geometry 47 of the connection element 45 is liquefied so that the melted material fills the receiving geometry 46.

In a groove 43 with a triangular cross section the O-ring seal 42 is inserted between the actuator assembly 30 and the hydraulic assembly 20. The O-ring seal 42 is axially compressed during joining of the actuator assembly 30 with the hydraulic assembly 20 while loaded with the axial joining force. Due to the sizing of the assemblies the O-ring seal 42 is permanently compressed after the actuator assembly 30 is connected with the hydraulic assembly 20.

The ultrasonic welding of the connection element 45 with the actuator housing 31 presses a radially interior circumferential bar 49 of the connection element 45 against the flange 28 of the valve housing 21 that is radially oriented at this location, so that the magnet assembly 30 is connected in a form locking manner with the hydraulic assembly 20. By the same token or additionally a form locking connection is conceivable using a suitable contour and opposite contour which can be configured for example at the connection element 45 and at the valve housing 21.

What is claimed is:

1. An electro hydraulic valve for a cam phaser, the electrohydraulic valve comprising:
   an electromagnetic actuator assembly including an actuator housing, and
   a hydraulic assembly, including a valve housing in which a valve piston is arranged to move along a longitudinal axis,
   wherein the electromagnetic actuator assembly and the hydraulic assembly are arranged axially aligned along the longitudinal axis,
   wherein a plunger for positioning the valve piston along the longitudinal axis is arranged within the electromagnetic actuator assembly,
   wherein the electromagnetic actuator assembly and the hydraulic assembly are connected with one another,
   wherein the electromagnetic actuator assembly is connected with the hydraulic assembly via friction or form locking provided by an ultrasonic weld between the actuator housing, and the valve housing,
   wherein the actuator housing extends over at least one undercut or flat spot at the valve housing in a friction locking or form locking manner at an end of the electromagnetic actuator assembly that is proximal to the valve housing when the ultrasonic weld is performed, and
   wherein the at least one undercut or flat spot is configured as a symmetrical polygon.

2. The electro hydraulic valve according to claim 1, wherein the actuator housing is made from a thermoplastic synthetic material and at least partially encloses the electromagnetic actuator assembly.

3. The electro hydraulic valve according to claim 1, wherein the valve housing is made from a metal material.

4. The electro hydraulic valve according to claim 1,
   wherein the valve housing has a circular flange at an end that is proximal to the actuator assembly, and
   wherein the circular flange is undercut or enveloped by the actuator housing.

5. The electro hydraulic valve according to claim 1, wherein an O-ring seal is arranged between the electromagnetic actuator assembly and the hydraulic assembly such that the O-ring seal is inserted into a ring groove.

6. The electro hydraulic valve according to claim 5,
   wherein a seal is inserted between the electromagnetic actuator assembly and the hydraulic assembly, and wherein
   the electromagnetic actuator assembly and the hydraulic assembly are sized such that the seal is compressed in the ring groove after the ultrasonic weld is performed.

7. An electro hydraulic valve for a cam phaser, the electrohydraulic valve comprising:
   an electromagnetic actuator assembly including an actuator housing, and
   a hydraulic assembly, including a valve housing in which a valve piston is arranged to move along a to axis,
   wherein the electromagnetic actuator assembly and the hydraulic assembly are arranged axially aligned along the longitudinal axis,
   wherein a plunger for positioning the valve piston along the longitudinal axis is arranged within the electromagnetic actuator assembly,
   wherein the electromagnetic actuator assembly and the hydraulic assembly are connected with one another,
   wherein the electromagnetic actuator assembly is connected with the hydraulic assembly via friction or form locking provided by an ultrasonic weld between the actuator housing and the valve housing, wherein the actuator housing extends over at least one undercut or flat spot at the valve housing in a friction locking or form locking manner at an end of the electromagnetic actuator assembly that is proximal to the valve housing when the ultrasonic weld is performed, and wherein the actuator housing includes pre-segmented bars which extend around the at least one undercut or flat spot after the ultrasonic weld is performed or which contact the at least one undercut or flat spot after the ultrasonic weld Is performed.

8. An electro hydraulic valve for a cam phaser, the electrohydraulic valve comprising:

an electromagnetic actuator assembly including an actuator housing, and a hydraulic assembly, including a valve housing in which a valve piston is arranged to move along a longitudinal axis, wherein the electromagnetic actuator assembly and the hydraulic assembly are arranged axially aligned along the longitudinal axis, wherein a plunger for positioning the valve piston along the longitudinal axis is arranged within the electromagnetic actuator assembly, wherein the electromagnetic actuator assembly and the hydraulic assembly are connected with one another, wherein the actuator housing is bonded by an ultrasonic weld with a connection element that includes at least one component, and wherein the connection element connects the hydraulic assembly in a friction locking manner with the electromagnetic actuator assembly after the ultrasonic weld is performed.

9. The electro hydraulic valve according to claim 8, wherein the actuator housing has a receiving geometry and the connection element has a corresponding penetration geometry, wherein the penetration geometry engage the receiving geometry to facilitate the ultrasonic weld.

10. The electro hydraulic valve according to claim 8, wherein the connection element includes a circumferential bar which is pressed against a flange of the valve housing after the ultrasonic weld is performed.

11. A method for producing an electro hydraulic valve, the method comprising:

connecting an actuator housing of an electromagnetic actuator assembly with a valve housing by an ultrasonic weld through friction locking or form locking, wherein the actuator housing extends over at least one undercut or flat spot at the valve housing in a friction locking or form locking manner at an end of the electromagnetic actuator assembly that is proximal to the valve housing when the ultrasonic weld is performed, and wherein the at least one undercut or flat spot is configured as a symmetrical polygon.

12. The method according to claim 11, further comprising:

fabricating the actuator housing from a thermoplastic synthetic material; and fabricating the valve housing from a metal material.

13. The method according to claim 11, further comprising:

axially compressing an O-ring seal between the actuator housing and the valve housing before performing the ultrasonic weld.

* * * * *